(12) United States Patent
Pitwon (10) Patent No.: US 9,529,153 B2
(45) Date of Patent: Dec. 27, 2016

(54) OPTICAL APPARATUS INCLUDING NESTED RESONATOR

(71) Applicant: Xyratex Technology Limited, Havant (GB)

(72) Inventor: Richard C. A. Pitwon, Fareham (GB)

(73) Assignee: Xyratex Technology Limited, Havant (GB)

( * ) Notice: Subject to any disclaimer, the term of this patent is extended or adjusted under 35 U.S.C. 154(b) by 0 days.

(21) Appl. No.: 14/701,542

(22) Filed: May 1, 2015

(65) Prior Publication Data

US 2016/0322778 A1 Nov. 3, 2016

(51) Int. Cl.
*G02B 6/28* (2006.01)
*G02B 6/293* (2006.01)
*G02B 6/12* (2006.01)

(52) U.S. Cl.
CPC . *G02B 6/29338* (2013.01); *G02B 2006/12121* (2013.01)

(58) Field of Classification Search
CPC ... G02B 6/29338–6/29343; G02B 2006/12131
See application file for complete search history.

(56) References Cited

U.S. PATENT DOCUMENTS

2004/0114658 A1* 6/2004 Stegmuller .............. H01S 5/10
372/97

OTHER PUBLICATIONS

Chao, et al., "Polymer Microring Resonators for Biochemical Sensing Applications," Feb. 2006, *Journal of Selected Topics in Quantum Electronics*, IEEE, 12(1):134-142.

Jeong, et al., "Low-loss, flat-topped and spectrally uniform silicon-nanowire-based $5^{th}$-order CROW fabricated by ArF-immersion lithography process on a 300-mm SOI wafer," Dec. 2013, *Optics Express*, 21(25):30163-30174.

Okamoto, et al., "Fabrication of Organic Spin-on Glass Microring Resonator with a Narrow Gap between a Microring Resonator and a Waveguide," 2010, *Japanese Journal of Applied Physics*, 49(7R):072502-1, 3 pages.

Rabus, et al., "Active and Passive Microring Resonator Filter Applications in GaInAsP/InP," *Conference Proceedings*, 2001 International Conference on Indium Phosphide and Related Materials, May 2001, Nara, Japan, pp. 477-480.

Ravindran, et al., "GaAs based long-wavelength microring resonator optical switches utilising bias assisted carrier-injection induced refractive index change," Jul. 2012, *Optics Express*, 20(14):15610-15627.

(Continued)

*Primary Examiner* — Jerry Rahll
(74) *Attorney, Agent, or Firm* — Mueting, Raasch & Gebhardt, P.A.

(57) ABSTRACT

Apparatuses that include an input and output waveguide; and a nested resonator including at least an external loop and a nested loop positioned entirely inside the external loop, each loop independently having a length that supports a single resonant wavelength, the external loop further including: an input interface configured to couple energy between the input waveguide and the nested resonator, an output interface configured to couple energy between the nested resonator structure and the output waveguide, and an internal interface, the external loop and the nested loop configured to couple energy there between via the internal interface.

20 Claims, 9 Drawing Sheets

(56) References Cited

OTHER PUBLICATIONS

Wu, et al., "Compact on-chip 1×2 wavelength selective switch based on silicon microring resonator with nested pairs of subrings," Feb. 2015, *Photonics Research*, 3(1):9-14.

Wu, et al., "Nested Silicon Microring Resonator with Multiple Coupling Regimes," 2012, *Photonics Global Conference*, Singapore, 2 pages.

Wu, et al., "Nested Configuration of Silicon Microring Resonator With Multiple Coupling Regimes," Mar. 2013, *Photonics Technology Letters*, IEEE, 25(6):580-583.

* cited by examiner

OPTICAL APPARATUS INCLUDING NESTED RESONATOR

SUMMARY

Disclosed are apparatuses that include an input and output waveguide; and a nested resonator including at least an external loop and a nested loop positioned entirely inside the external loop, each loop independently having a length that supports a single resonant wavelength, the external loop further including: an input interface configured to couple energy between the input waveguide and the nested resonator, a n output interface configured to couple energy between the nested resonator structure and the output waveguide, and an internal interface, the external loop and the nested loop configured to couple energy there between via the internal interface.

Also disclosed are apparatuses that include an input waveguide; at least a first and second output waveguide; a first nested resonator configured adjacent the first output waveguide; and a second nested resonator configured adjacent the second output waveguide; each of the first and the second nested resonators having at least an external loop and a nested loop positioned entirely inside the external loop, each loop independently having a length that supports a single resonant wavelength, the external loop further including: an input interface configured to couple energy between the input waveguide and the nested resonator, an output interface configured to couple energy between the nested resonator structure and the output waveguide, and an internal interface, the external loop and the nested loop configured to couple energy there between via the internal interface.

Also disclosed are apparatuses that include an input and output waveguide; and a nested resonator having at least an external loop and a nested loop positioned entirely inside the external loop, each loop independently having a length that supports a single resonant wavelength, each loop being silicon nitride ($Si_3N_4$), and the external loop further including: an input interface configured to couple energy between the input waveguide and the nested resonator, an output interface configured to couple energy between the nested resonator structure and the output waveguide, and an internal interface, the external loop and the nested loop configured to couple energy there between via the internal interface.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Photonic Integrated Circuit (PIC) devices including, but not limited to, silicon photonic devices may utilize an external continuous wave (CW) laser source, in contrast with conventional photonic devices that utilize integrated laser sources. For example, an external CW laser can be coupled to silicon waveguides using grating couplers, evanescent couplers or mode converted butt-couplers. Alternatively, a so-called hybrid scheme can be used, where a gain device, such as a semiconductor optical amplifier (SOA) comprised of a gain medium such as indium phosphide (InP) for example, is incorporated with a silicon waveguide and the silicon structure itself forms part of the laser cavity. Most operational elements in silicon photonic devices are highly sensitive and a stable input signal becomes important. In high-cost, sensitive devices, expensive temperature controls such as Peltier devices can be used to maintain stability. However, for high volume, mass-produced, low cost devices, it is impractical to use expensive temperature controls and therefore low cost devices may be prone to many types of instability. In particular, real-time changes in electrical power consumption in certain parts of the device may cause temperature fluctuations. Furthermore, the CW source may not be local to the photonic device. Rather, it is often coupled to the photonic device through optical fibers from a less temperature critical location. Any movement of the optical fiber, such as movement caused by air turbulence, may cause fluctuations in the optical power fed to the waveguides of the device. More generally, any electrical fluctuations in the CW source power supply may also cause instability in the optical signal the source produces. Because of these sources of instability there remains a need for methods and devices to stabilize optical signals from CW sources.

Disclosed devices may provide the ability to stabilize and smooth optical signals from CW sources, select one or more wavelengths from CW sources, or combinations thereof. In some embodiments, smoothing an optical signal can refer to spectral smoothing (e.g., the device is acting as a wavelength filter), temporal smoothing (e.g., the device is acting to smooth fluctuations in optical amplitude), or some combination thereof.

Figure 1:
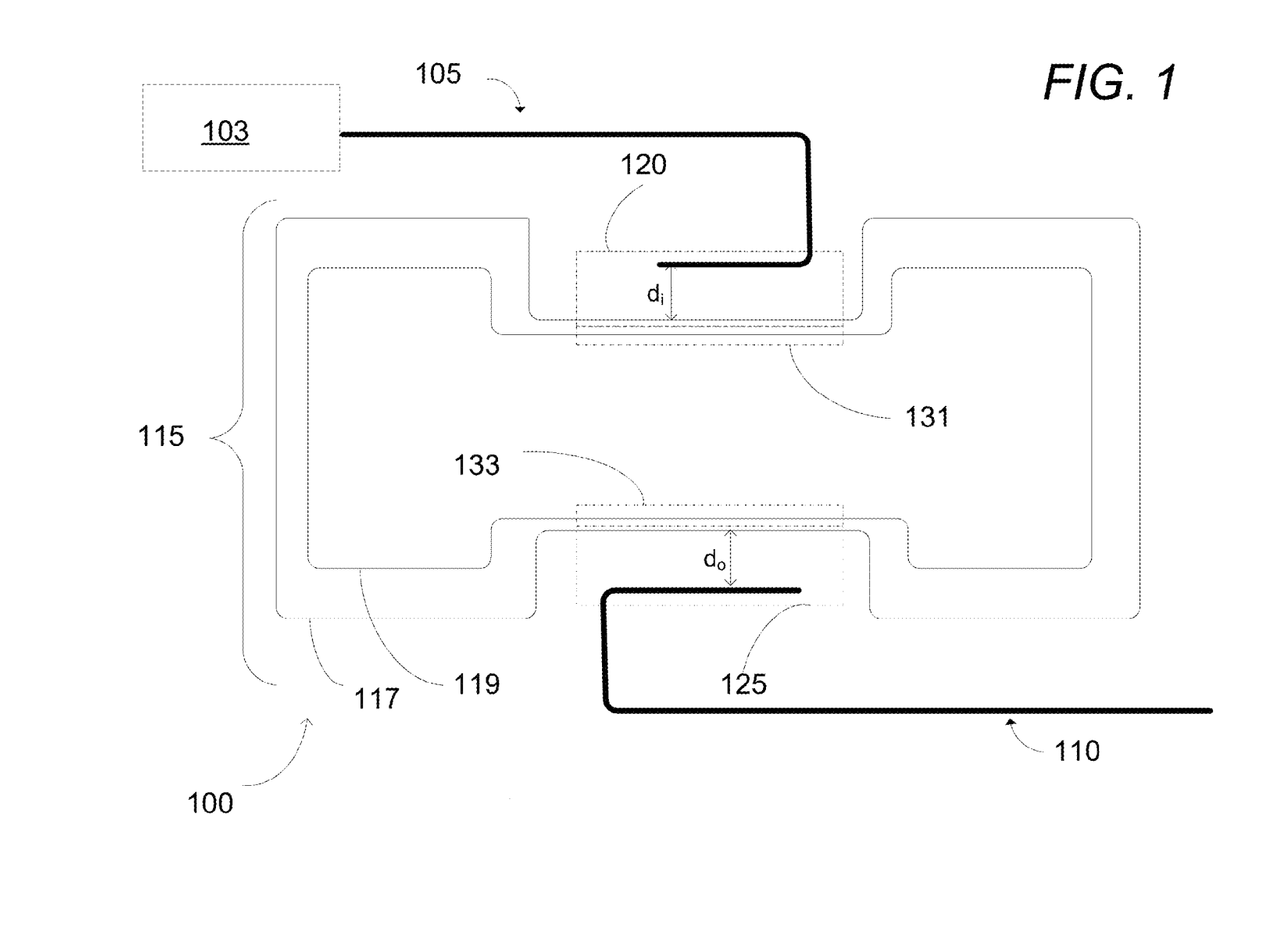
FIG. 1 is a schematic illustration of disclosed embodiments of apparatuses.

FIG. 1 depicts an illustrative embodiment of a disclosed apparatus 100. A disclosed apparatus 100 can include or be associated with an input waveguide 105 and an output waveguide 110. The input waveguide 105 can be any optical component that can carry an input optical signal and the output waveguide 110 can be any optical component that can carry an output optical signal. In some embodiments, the input waveguide 105 and the output waveguide 110 may be formed from silicon and can be disposed on an insulator for example. A disclosed apparatus may also be associated with an optional optical source 103. The optional optical source 103 may be separate from the disclosed apparatus 100, the optional optical source 103 may be configured to interact with the apparatus 100, the optional optical source 103 may be associated with the apparatus 100, the optional optical source 103 may be formed on or within the same structure or substrate that the apparatus 100 is, or any combination thereof. In some embodiments, the optional optical source 103 may be a continuous wave (CW) laser for example.

Disclosed apparatus 100 also includes a nested resonator 115. The nested resonator is at least adjacent to the input waveguide 105 and the output waveguide 110. The nested resonator includes at least an external loop 117 and a nested loop 119. The nested loop 119 is positioned entirely inside the external loop 117, e.g., it is nested inside the external loop 117. Although the nested resonator 115 in FIG. 1 shows only two loops (117 and 119) it should be noted nested resonators can include any number of loops, but include at least two loops. All additional loops of nested resonators are nested inside the external loop, the nested loop, etc. Each loop (be it two or more) is a closed loop. Each of the loops in a nested resonator may be formed from silicon and can be disposed on an insulator for example. The loops of a nested resonator are arranged and configured such that the optical energy propagating around one loop can couple evanescently into adjacent loops. The region or location where the energy from one loop can couple into an adjacent loop can be referred to as an internal interface. Each loop of a nested resonator can have one or more than one internal interfaces.

Each loop of a nested resonator can be described by its length. The length of a loop is the distance around the entire loop. Each loop of a nested resonator independently has a different length, with the length of each loop decreasing as the loop is nested inside other larger loops. Each loop however has a length that supports a single resonant wavelength. Stated another way, each of the loops in a nested resonator has a different length, but each of those different independent lengths supports a single resonant wavelength. Equation 1 explains the relationship of the length of a loop to the resonant wavelength.

$$m\lambda_m = l n_{eff} \quad (1)$$

In Equation 1, m is an integer, which is the multiple of the resonant wavelength, $\lambda_m$ is the resonant wavelength, l is the length of the loop, and $n_{eff}$ is the effective refractive index of the ring. Therefore, each of the loops in a nested resonator carries a different multiple of the same resonant wavelength.

In some embodiments, a loop within a nested resonator can have a length that is at least 6 µm. In some embodiments, a loop within a nested resonator can have a length that is at least 20 µm. In some embodiments, a loop within a nested resonator can have a length that is at least 35 µm. In some embodiments, a loop within a nested resonator can have a length that is at least 38 µm. In some embodiments, the maximum length of a loop can be determined by the loss characteristics of the waveguide material. In some embodiments, a loop within a nested resonator can have a length that is not greater than 1 mm. In some embodiments, a loop within a nested resonator can have a length that is not greater than 350 µm.

The external loop 117 of the nested resonator 115 also includes an input interface 120 and an output interface 125. The input interface 120 is configured to couple energy between the input waveguide 105 and the nested resonator 115 or more specifically the external loop 117 of the nested resonator. The input interface 120 can generally be described as a region or location where the input waveguide 105 and the external loop 117 are at least adjacent. The input interface 120 can be described as the location or region where the input waveguide 105 and the external loop 117 are the closest. The input interface 120 can be more specifically described by the distance between the input waveguide 105 and the external loop 117 at the input interface 120. In the particular embodiment of FIG. 1A, the input waveguide 105 is spaced apart from the external loop 117 at the input interface 120. This distance is given as $d_i$. Generally this distance can be within the evanescent field region of the coupling waveguides in order to enable coupling.

The output interface 125 is configured to couple energy between the nested resonator 115 or more specifically the external loop 117 of the nested resonator and the output waveguide 110. The output interface 125 can generally be described as a region or location where the output waveguide 110 and the external loop 117 are at least adjacent. The output interface 125 can be described as the location or region where the output waveguide 110 and the external loop 117 are the closest. The output interface 125 can be more specifically described by the distance between the output waveguide 110 and the external loop 117 at the output interface 125. In the particular embodiment of FIG. 1A, the output waveguide 110 is spaced apart from the external loop 117 at the output interface 125. This distance is given as $d_o$. Generally this distance can be within the evanescent field region of the coupling waveguides in order to enable coupling.

$d_i$ and $d_o$ can be chosen such that the apparatus satisfies an "on-resonance" condition. $d_i$ and $d_o$ may but need not be the same. $d_i$ and $d_o$ independently may depend on a number of parameters, including $\lambda_m$, the material from which various components of the apparatus are formed and their corresponding refractive index, the dimensions of the various components, or combinations thereof for example. These conditions can be considered in order to obtain an on-resonance configuration, for example. In some embodiments, $d_i$ and $d_o$ as well as the various parameters discussed above can be chosen so that the wave-form of the optical mode of the output waveguide 110 after the nested resonator 115 is 180° out of phase with respect to the wave-form of any energy coupling out of the nested resonator back to the input waveguide 105. In some embodiments, $d_i$ and $d_o$ are chosen so that energy is efficiently coupled into the nested resonator 115 from the input waveguide 105 and efficiently coupled out from the nested resonator 115 into the output waveguide 110.

In some embodiments, $d_i$ and $d_o$ can be not less than 30 nm. In some embodiments, $d_i$ and $d_o$ can be not less than 200 nm. In some embodiments, $d_i$ and $d_o$ can be not greater than 300 nm. The particular values of $d_i$ and $d_o$ in any device can depend at least in part on the materials utilized.

In some embodiments, the input waveguide and the output waveguide can be configured substantially parallel to the external loop of the nested resonator at distances of $d_i$ and $d_o$ respectively. Such configurations can allow energy to be exchanged from the waveguide (either input or output) to the external loop and vice versa. By controlling the length where they run parallel to each other, the length over which they are $d_i$ and $d_o$ apart, or both, the energy in the waveguide can be controllably transferred to (in the case of the input waveguide) or from (in the case of the output waveguide) the external loop of a nested resonator. Such configurations can be characterized as directional couplers.

The illustrative apparatus 100 of FIG. 1, for example, may function as follows. An optical signal from an external energy source (such as optional CW laser 103 for example) propagates along the input waveguide 105. As the optical signal approaches the part of the input waveguide 105 that is proximal to the nested resonator 115, e.g., the input interface 120, the energy of the optical signal couples evanescently into the nested resonator 115. Whilst the amount of energy stored in the nested resonator 115 builds up (e.g., while the energy couples from the external loop 117 or 118 to the nested loop 119, and to any additional internal loops that may be present), some of the energy is coupled out to the output waveguide 110 as an output signal. The energy stored in the nested resonator 115 continues to build up until it is saturated, at which point the amount of energy coupling into the nested resonator 115 equals the amount of energy coupling out to the output waveguide 110 (e.g., the apparatus reaches a steady state). Due to its physical limits, the nested resonator 115 cannot respond in time to fluctuations in the input optical signal that span a time period shorter than the time it takes for the nested resonator 115 to respond (also known as its response time). Consequently, any fluctuations in the input optical signal are smoothed out in the signal that is output to the output waveguide 110. Additionally, once the apparatus has reached steady state, the energy stored in the apparatus tends to redress any imbalance in the input optical signal by "self-adjusting" the energy coupled out as the output optical signal. In some embodiments, therefore disclosed apparatus may be able to decouple fluctuations in the input optical signal from the output optical signal to produce a relatively stable output signal from an unstable input signal. For instance, in silicon photonics, which often requires an external light source in place of an integrated "on-chip" light source, disclosed apparatuses may be used to provide a relatively stabilised optical signal to devices that prefer or even require a relatively stable input.

In some embodiments, disclosed apparatus can provide functionality that is similar to a Coupled Resonator Optical Waveguide (CROW). Disclosed apparatuses however offer a significant advantage in the space necessary for such structures because of the nested nature of the nested resonators. As such disclosed apparatuses can also act as enhanced spectral filters, with a flattened output channel response having a steep roll-off and high out-of-band rejection ratio, for example.

In some embodiments, nested resonators may have at least two loops, e.g. an external loop and a first nested loop. In some embodiments, nested resonators may have at least three (3) loops. In some embodiments, nested resonators may have at least four (4) loops. In some embodiments, nested resonators may have at least 5 loops. In some embodiments, nested resonators may have not more than 10 loops. The maximum number of loops in nested resonators may be limited at least in part by the material of the loops. The more lossless the material of the loops, the more loops can be included in a nested resonator. In some embodiments where an active gain medium (discussed below) is utilized, nested resonators can include at least ten (10) loops, for example.

In some embodiments, a nested resonator (e.g., the nested loops thereof) can be made of any material that is compatible with a substrate upon which it is formed. In some embodiments, a nested resonator (and optionally other components in disclosed apparatuses) can be formed on a silicon wafer, for example. In some embodiments, a nested resonator can be made of silicon, silicon nitride ($Si_3N_4$), glass, polymers, indium phosphide, gallium arsenide, or any combination thereof. In some embodiments, a nested resonator can be made of silicon nitride ($Si_3N_4$) for example. In some embodiments, nested resonators can be made of materials that are lossless, or almost lossless. Such materials could include active gain mediums, such as indium phosphide for example. When operated, nested resonators made of active gain mediums could amplify optical signals as well. Such devices could be referred to as or act as something similar to an enhanced gain chip, which could more specifically be referred to as a semiconductor optical amplifier with enhanced internal filtering.

In some embodiments, a nested resonator can have overall dimensions of not greater than 5 mm. In some embodiments, a nested resonator can have overall dimensions of not greater than 1 mm. In some embodiments, a nested resonator can have overall dimensions of not greater than 500 μm. In some embodiments, a nested resonator can have overall dimensions of not less than 10 μm. In some embodiments, a nested resonator can have overall dimensions of not less than 50 μm. In some embodiments, a nested resonator can have overall dimensions of not less than 250 μm.

Figure 2:
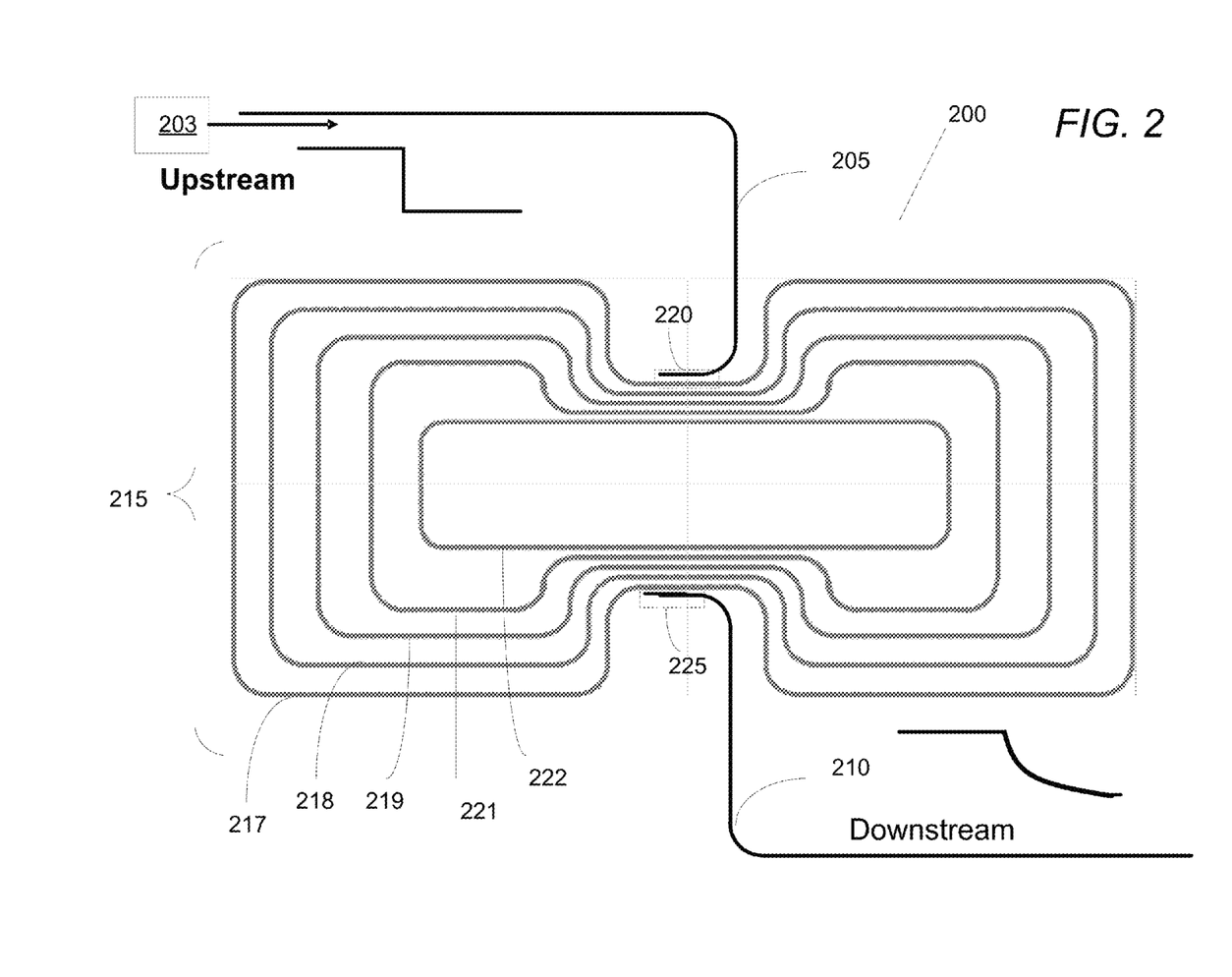
FIG. 2 is a schematic illustration of a disclosed embodiment of an apparatus that includes a nested resonator having five loops.

FIG. 2 discloses another illustrative apparatus 200. This particular apparatus includes an input waveguide 205, an output waveguide 210 and a nested resonator 215. Also depicted in the apparatus 200 is an optional source 203. The source 203 may be associated with the apparatus or part of the apparatus. The source 203 provides energy to the input waveguide 205. The energy propagates along the input waveguide 205 and is coupled into the nested resonator 215 via an input interface 220; more specifically the energy is coupled into the external loop 217. The energy is then coupled into the other nested loops of the nested resonator 215. This particular illustrated nested resonator includes an external loop 217, a first nested loop 218, a second nested loop 219, a third nested loop 221, and a fourth nested loop 222. It should be understood that nested resonators can include any number of loops. The energy is coupled from the nested resonator 215 to the output waveguide 210 via an output interface 225; more specifically the energy is coupled from the external loop 217 to the output waveguide 210. It should be noted that each nested loop has a point or region where it is adjacent to both the next internal loop (if there is one) and the next external loop (if there is one). That point or region, or internal interface, is where the energy couples back and forth between the two loops. The depictions of the waveforms at the upstream point and the downstream point show a possible effect of the apparatus, e.g., to smooth the optical response.

Figure 3:
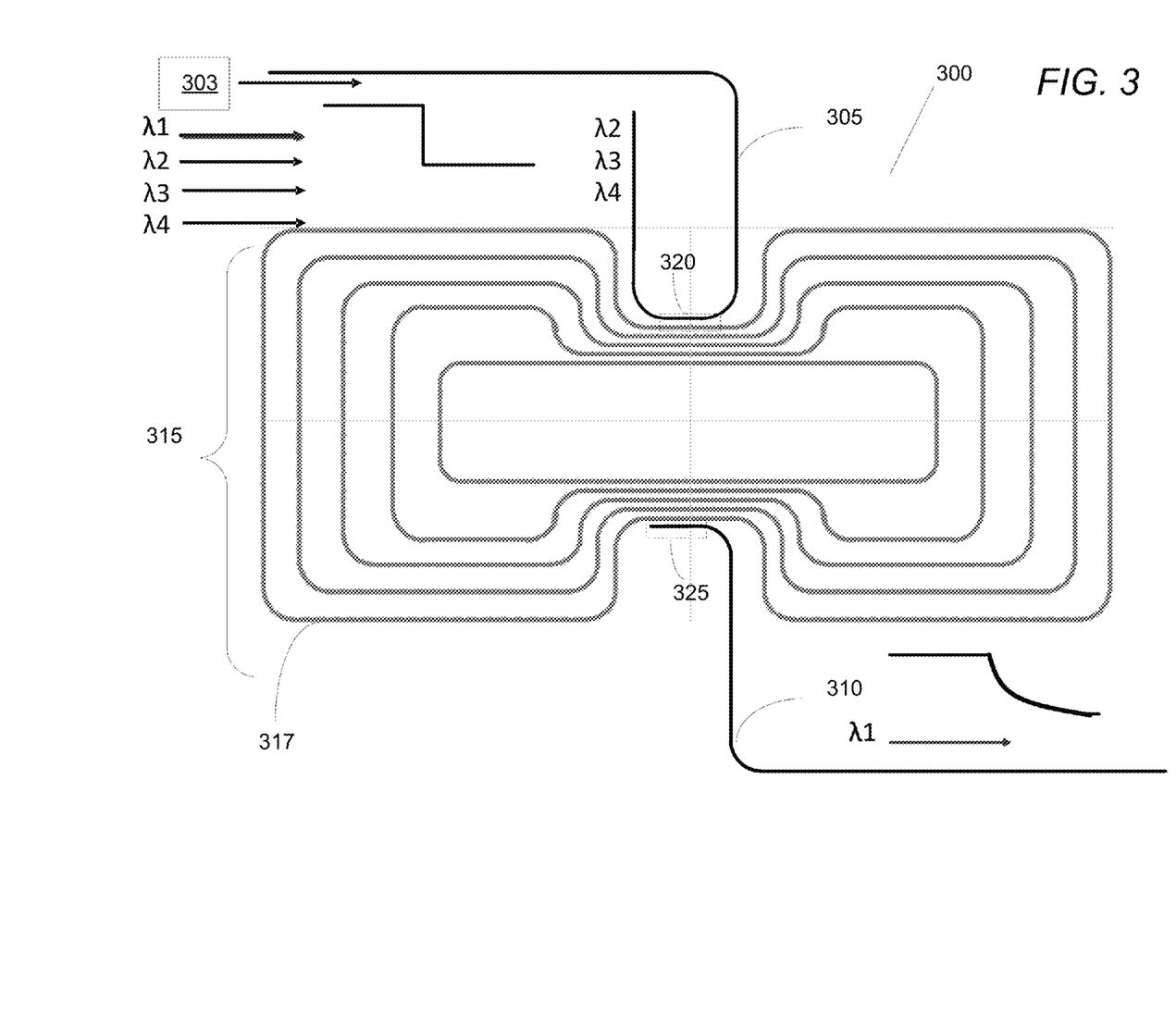
FIG. 3 is a schematic illustration of a disclosed embodiment of an apparatus that is wavelength selective.

FIG. 3 shows an example of an apparatus that could be utilized both to smooth an optical signal and select a single wavelength (or wavelength range) from an optical signal. This particular apparatus 300 includes an input waveguide 305, an output waveguide 310 and a nested resonator 315. Also depicted in the apparatus 300 is an optional source 303. The source 303 may be associated with the apparatus or part of the apparatus. The source 303 provides energy to the input waveguide 305. Specifically, the optional source 303 provides an optical signal that includes at least λ1, λ2, λ3 and λ4. Typically this relates to a wavelength multiplexed signal comprising in this case 4 separate signals, each encoded on a different wavelength, the 4 signals having been combined onto the input waveguide 305. The energies (of all four wavelengths) propagate along the input waveguide 305 and, as the nested resonator is tuned to only wavelength λ1, just the energy λ1 is coupled from the input waveguide 305 into the nested resonator 315 via an input interface 320, more specifically the energy is coupled into the external loop 317 of the nested resonator 315. The energies of the remaining wavelengths λ2, λ3 and λ4, are not coupled into the nested resonator so continue to propagate along the input waveguide. The energy of the λ1 signal can then be coupled into and/or out of the other nested loops of the nested resonator 315, which are also configured to support a resonance condition at λ1. This particular illustrated nested resonator includes an external loop 317 and four nested loops (not numbered). It should be understood that nested resonators can include any number of loops. The energy of the λ1 signal is coupled from the nested resonator 315 to the output waveguide 310 via an output interface 325; more specifically the energy is coupled from the external loop 317 of the nested resonator to the output waveguide 310. The only wavelength of the optical signal that will be coupled into the output waveguide 310 is λ1 in this case, because the loops in the nested resonator had independent lengths that supported λ1. The apparatus may also serve to smooth the waveform of λ1. Such an apparatus could be described as a wavelength selective optical capacitor and filter.

Figure 4:
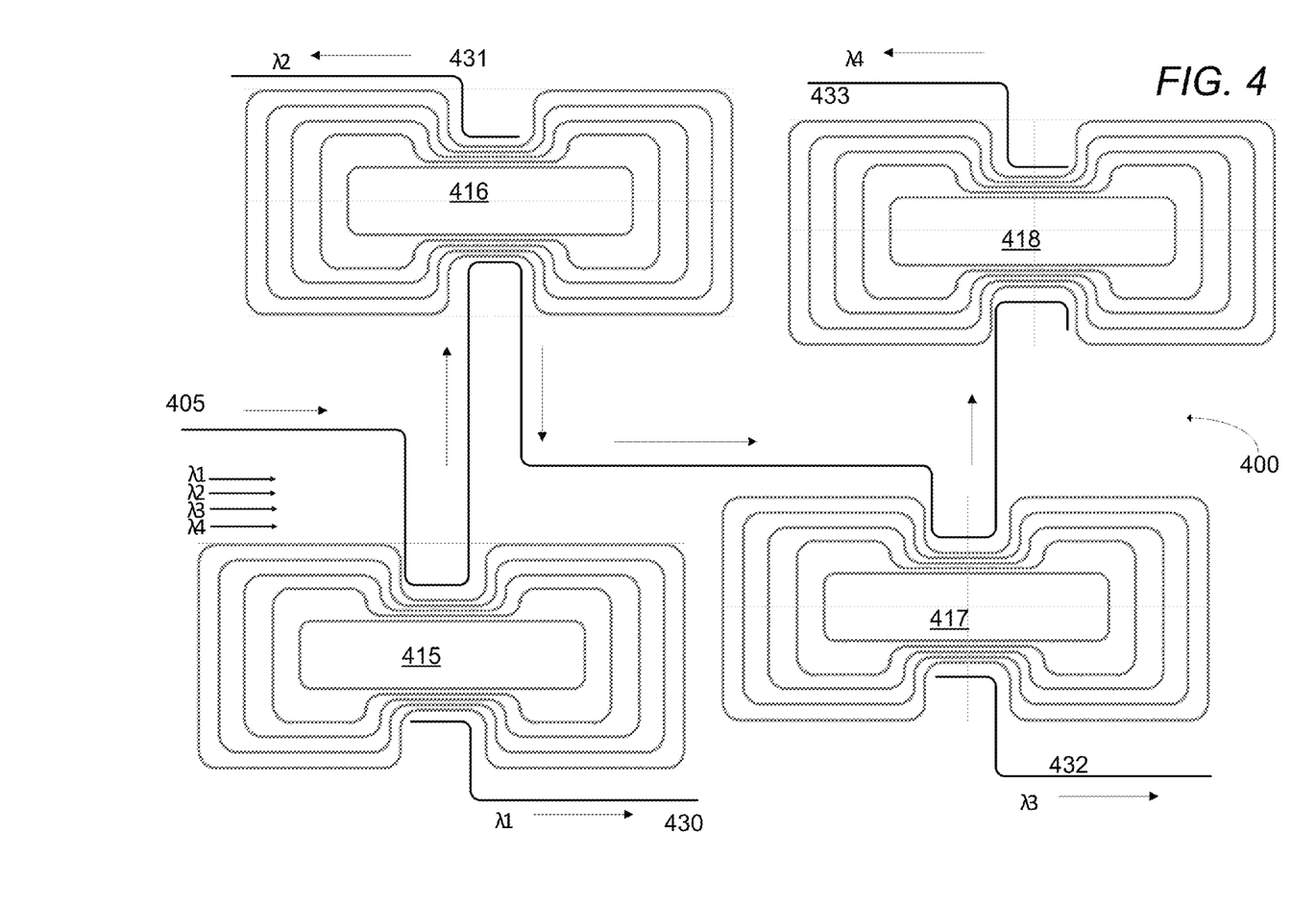
FIG. 4 is a schematic illustration of a disclosed embodiment of an apparatus that includes four wavelength selective nested resonators.

FIG. 4 shows another illustrative apparatus. The apparatus 400 includes an input waveguide 405, a first nested resonator 415, a second nested resonator 416, a third nested resonator 417, and a fourth nested resonator 418. The optical signal that is being carried via the input waveguide 405 is depicted herein as including at least four different wavelengths, λ1, λ2, λ3 and λ4, but could include any number of wavelengths. Specifically, an optional source (not depicted in FIG. 4), which could be the output of a wavelength division multiplexer, provides a combined optical signal that includes separate signals at discrete wavelengths of at least λ1, λ2, λ3 and λ4. Each of the nested resonators is configured with nested loops that support different resonant wavelengths. More specifically in this illustrative embodiment, the first nested resonator 415 includes nested loops all of which independently have different lengths but all support λ1; the second nested resonator 416 includes nested loops all of which independently have different lengths but all support λ2; the third nested resonator 417 includes nested loops all of which independently have different lengths but all support λ3; and the fourth nested resonator 418 includes nested loops all of which independently have different lengths but all support λ4 respectively. The apparatus 400 also includes four output waveguides. Specifically, the first output waveguide 430 is configured at least adjacent to the first nested resonator 415 at an output interface (not labelled for the sake of convenience, but located where the external loop of the first nested resonator 415 is closest to the first output waveguide 430); the second output waveguide 431 is configured at least adjacent to the second nested resonator 416 at an output interface (not labelled for the sake of convenience, but located where the external loop of the second nested resonator 416 is closest to the second output waveguide 431); the third output waveguide 432 is configured at least adjacent to the third nested resonator 417 at an output interface (not labelled for the sake of convenience, but located where the external loop of the third nested resonator 417 is closest to the third output waveguide 432); and the fourth output waveguide 433 is configured at least adjacent to the fourth nested resonator 418 at an output interface (not labelled for the sake of convenience, but located where the external loop of the fourth nested resonator 418 is closest to the fourth output waveguide 433). Each of the nested resonators couples their supported wavelength from the optical signal in the input waveguide 405 and transmits it to their respective output waveguide. Such an apparatus can function to split a multi wavelength signal into two or more (four in the particular embodiment illustrated in FIG. 4) wavelength specific signals and transmit it to different output waveguides. The apparatus may also serve to smooth the waveform of each of λ1, λ2, λ3 and λ4. Such an apparatus could be utilized as an optical capacitor, add-drop network for wavelength division multiplexing (WDM), or any combination thereof.

Figure 5:
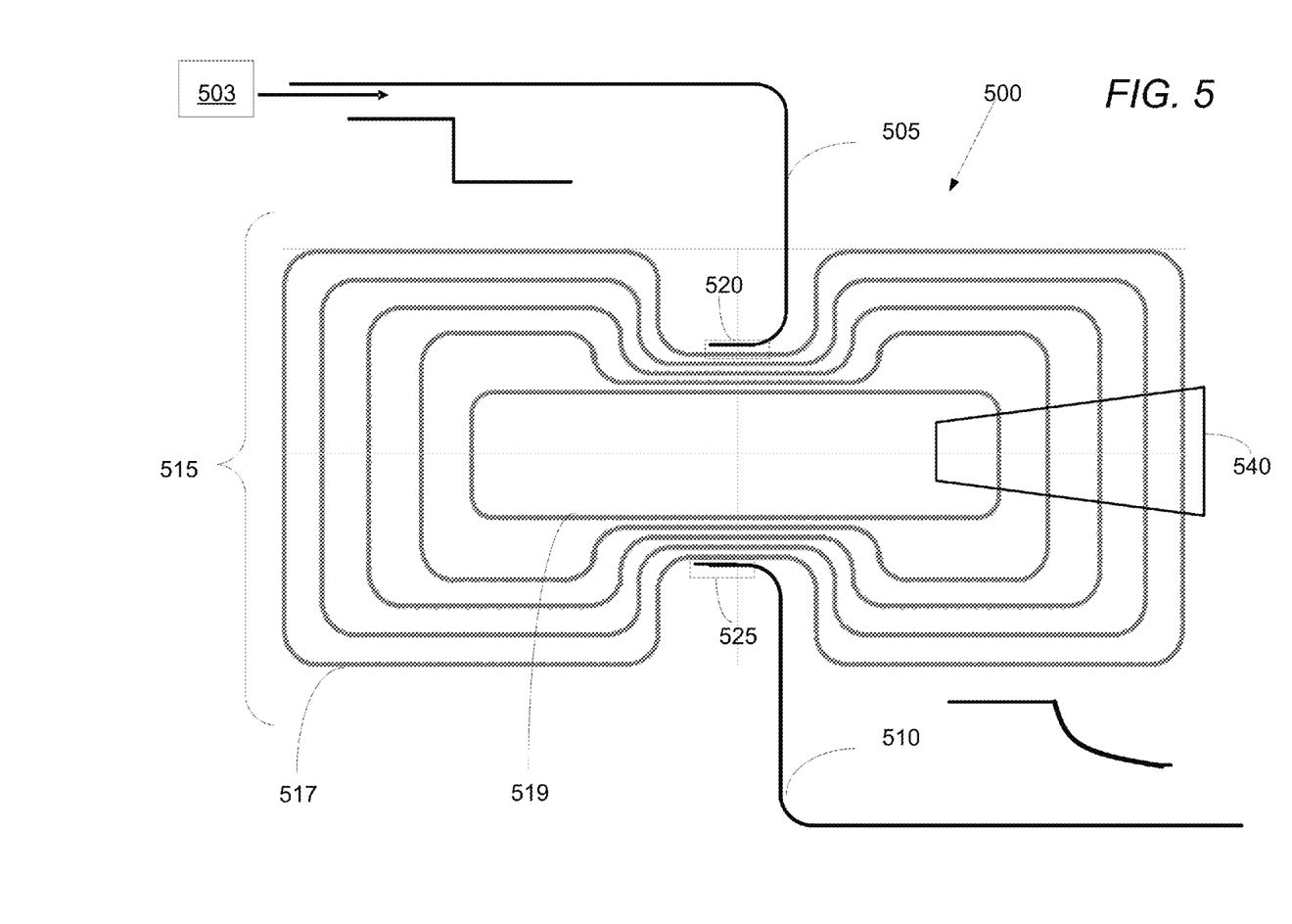
FIG. 5 is a schematic illustration of a disclosed embodiment of an apparatus that includes a group refractive index tuning element.

FIG. 5 shows another illustrative embodiment of an apparatus. Such apparatuses can include a group refractive index tuning element 540. All other elements of FIG. 5 are numbered similarly (e.g., the optional source 503, the input waveguide 505, the output waveguide 510, the nested resonator 515, the input interface 520, and the output interface 525). Group refractive index tuning elements such as 540 can function to change or modulate the refractive index of at least a portion of at least one loop of the nested resonator. Changing the refractive index of some portion of one or more of the nested loops can function to tune the effective refractive index of the loop so that the loop geometries can be varied for efficient use of space, whilst still satisfying a resonance condition for evanescent coupling. Such an arrangement may also function as a switching mechanism in the sense that by operating the means for changing the refractive index, the respective refractive indices of one of more of the loops may be tuned so as to satisfy the resonance condition.

In some embodiments, a refractive index tuning element 540 can be a thermal element. The apparatus 500 generally works in the same fashion as the apparatus described with respect to FIG. 2 above. The refractive index tuning element 540 can be positioned in close proximity to the nested structure and can be arranged to be operable to control the temperature of at least a portion of at least one, and in some embodiments, all the loops of the nested resonator. The sizes of the portions of the refractive index tuning element 540 that interact with each loop can be determined based on the sizes of the loops and the temperature effect of the refractive index tuning element. The change in refractive index due to change in temperature is determined by the thermo-optic coefficient of the waveguide material. In some embodiments, such as that depicted in FIG. 5, the portion of each loop that is to be subjected to temperature control via the refractive index tuning element 540 decreases in length from the external loop 517 to the most inner loop 519 (which could also be described as the fourth nested loop in this particular embodiment).

In some embodiments, the refractive index tuning element 540 could also be a portion of each of the loops that is doped (instead of a portion of the loop subjected to temperature control). A refractive index tuning element based on carrier injection or carrier depletion, instead of the above-described thermal element, could be provided as the refractive index tuning element 540. The carrier injector/depletor could be arranged to be operable to inject/deplete electrical carriers, such as electrons or holes, in the doped portions of semiconductor materials, such as p-n junctions for example. By injecting or depleting electrical carriers in the doped portions, the refractive index of the portions, and thus the effective refractive index of the loops, is changed. The sizes of the portions that are doped can be determined based on the sizes of the loops and the carrier injector could be arranged accordingly. Additionally, the level and type (i.e. n-type or p-type) of doping of each portion could also be based on the diameter of the loop and the portion to be doped. In the illustration represented by FIG. 5, the size of the doped portion of each loop could decrease in length from the external loop 517 to the inner most loop 519, the level/type of doping could progress from p-type in the external loop to n-type in the inner most loop, or some combination thereof. Apparatuses that include refractive index tuning elements of any type could be referred to as tunable optical resonant structures, for example.

Figure 6:
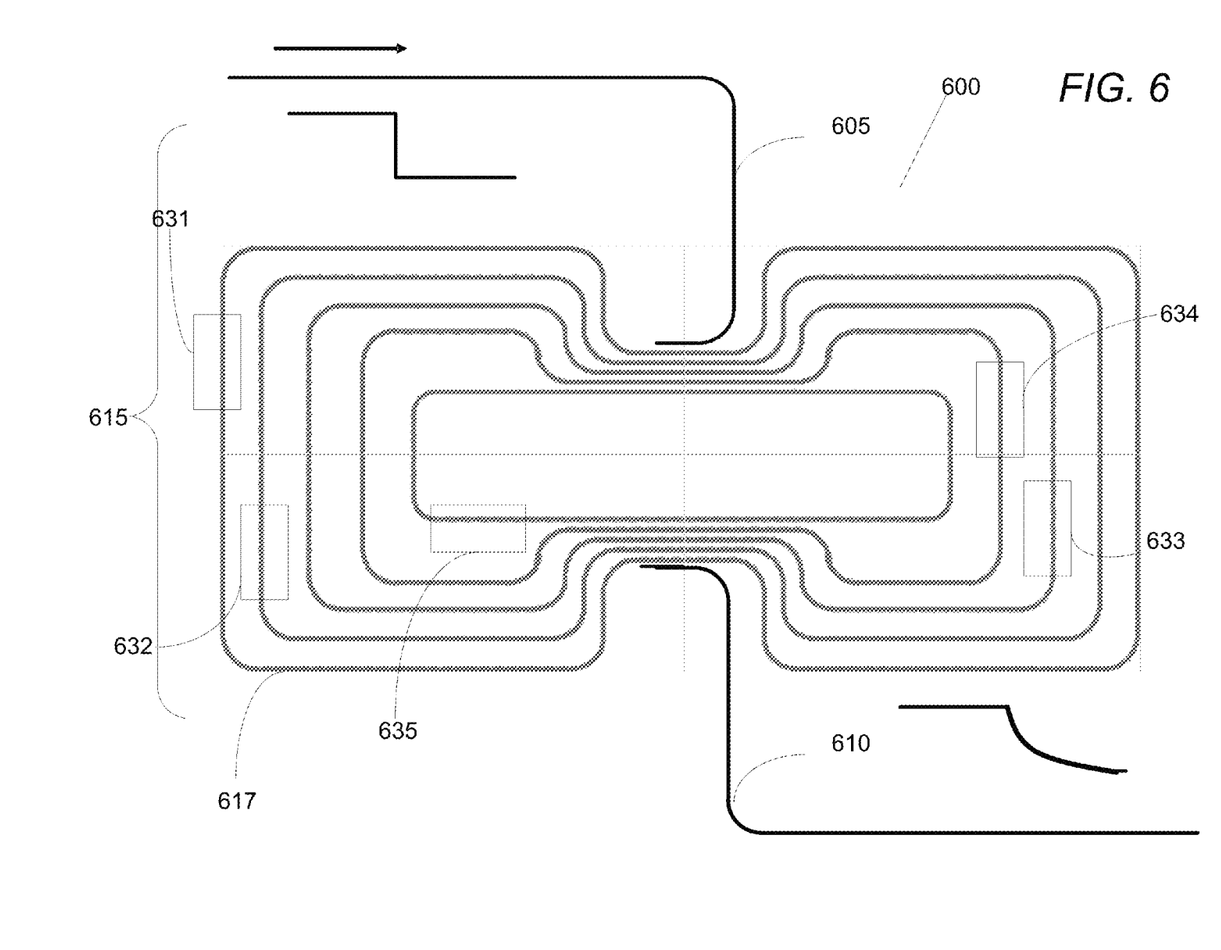
FIG. 6 is a schematic illustration of a disclosed embodiment of an apparatus that includes individual refractive index tuning elements.

FIG. 6 shows an illustrative embodiment that includes individual refractive index tuning elements. In this particular embodiment, the loops are configured with individual tuning elements (in comparison to the refractive index tuning element 540 depicted in FIG. 5) that can affect the refractive index of each loop independently. Such a configuration can offer greater control and flexibility over the performance of the apparatus. The apparatus 600 in FIG. 6 shows an input waveguide 605, an output waveguide 610, a nested resonator 615 that includes an external loop 617 as well as four internal nested loops (not numbered in FIG. 6), and five individual refractive index tuning elements 631, 632, 633, 634 and 635 respectively. As illustrated by the external loop 617 and the first individual refractive index tuning element 631, each of the individual refractive index tuning elements are configured to effect the refractive index of at least a portion of a single loop of the nested resonator. In some embodiments, each of the loops can have an associated individual refractive index tuning element and in some embodiments, not all of the loops need have associated individual refractive index tuning elements. The individual refractive index tuning elements can be based on either thermal effects or carrier injection or carrier depletion effects (just as the group refractive index tuning element was). The purpose of the individual refractive index tuning elements can be described in the same way as that of the group refractive index tuning element, except that the individual refractive index tuning elements individually affect each loop separately.

Although most illustrative embodiments depicted and described herein show an hourglass type structure, it should be noted that any shape could be utilized for the loops of the nested resonator. Any structure that offers regions of adjacent loops where coupling between the two loops can occur (e.g., any structure that has internal interfaces) can be utilized in any disclosed embodiments. Also, although most illustrative embodiments depicted and described herein show the internal interfaces between adjacent loop in the same vicinity as the input interface and the output interface, such overlap in location is not necessary. In some embodiments however, each of the internal interfaces, the input interface and the output interface can all be in a localized or common region, such as can be seen in FIG. 2, for example. Also, although most illustrative embodiments depicted and described herein show that each loop has internal interfaces with each of the loops adjacent thereto, that also is not necessary (a loop can have more or less internal interfaces).

Figure 7:
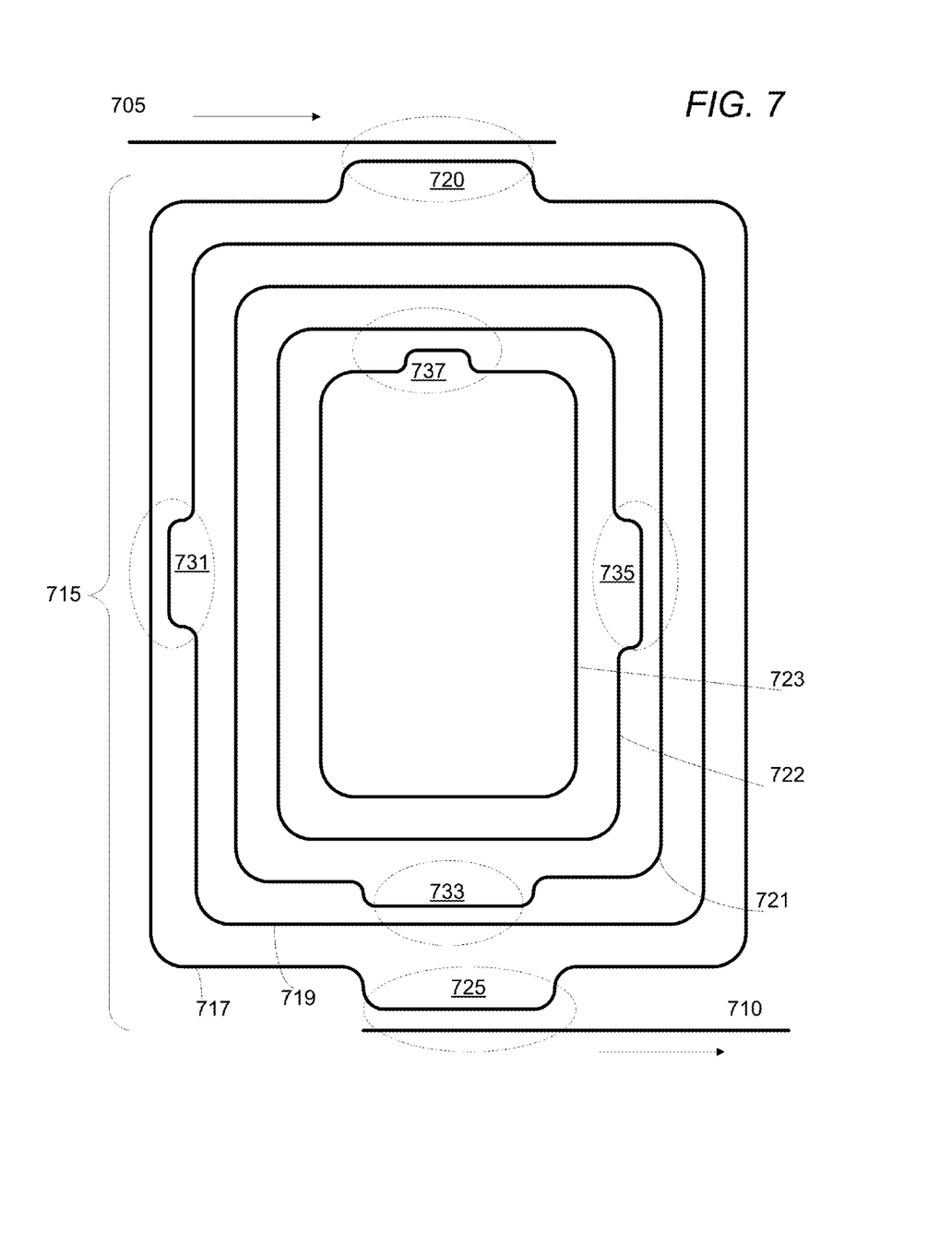
FIG. 7 is a schematic illustration of a disclosed embodiment of an apparatus where each internal nested loop has only a single internal coupling interface to the outer adjacent loop.

FIG. 7 shows an illustrative embodiment that includes non-hourglass shaped loops in a nesting resonator as well as loops that only include one coupling region with each adjacent loop. The apparatus 700 in FIG. 7 includes an input waveguide 705, an output waveguide 710 and a nested resonator 715. The nested resonator 715 in the illustrated embodiment includes an external loop 717, a first nested loop 719, a second nested loop 721, a third nested loop 722 and a fourth nested loop 723. The external loop 717 includes an input interface 720 to couple energy between the input waveguide 705 and the nested resonator 715 and an output interface 725 to couple energy between the nested resonator 715 and the output waveguide 710. The first nested loop 719 includes a first internal interface 731 that allows energy to be coupled between the external loop 717 and the first nested loop 719. It should also be noted that external loop 717 (or any other loop in this or any other nested resonator) could also include a configuration that affords coupling to the first coupling region 731 of the first nested loop 719 (e.g., both of the loops could be formed and configured so that the two loops form the first internal interface). The first nested loop 719 could also include second or additional internal interfaces for coupling energy between itself and the external loop, the second nested loop 721, or both. The second nested loop 721 includes a second internal interface 733 that allows energy to be coupled to the first nested loop 719. The third nested loop 722 includes a third internal interface 735 that allows energy to be coupled to the second nested loop 721. The fourth nested loop 723 includes a fourth internal interface 737 that allows energy to be coupled to the third nested loop 722, The second nested loop 721, the third nested loop 722 and the fourth nested loop 723 can each independently also include additional internal interfaces, such as those discussed above for example.

Figure 8:
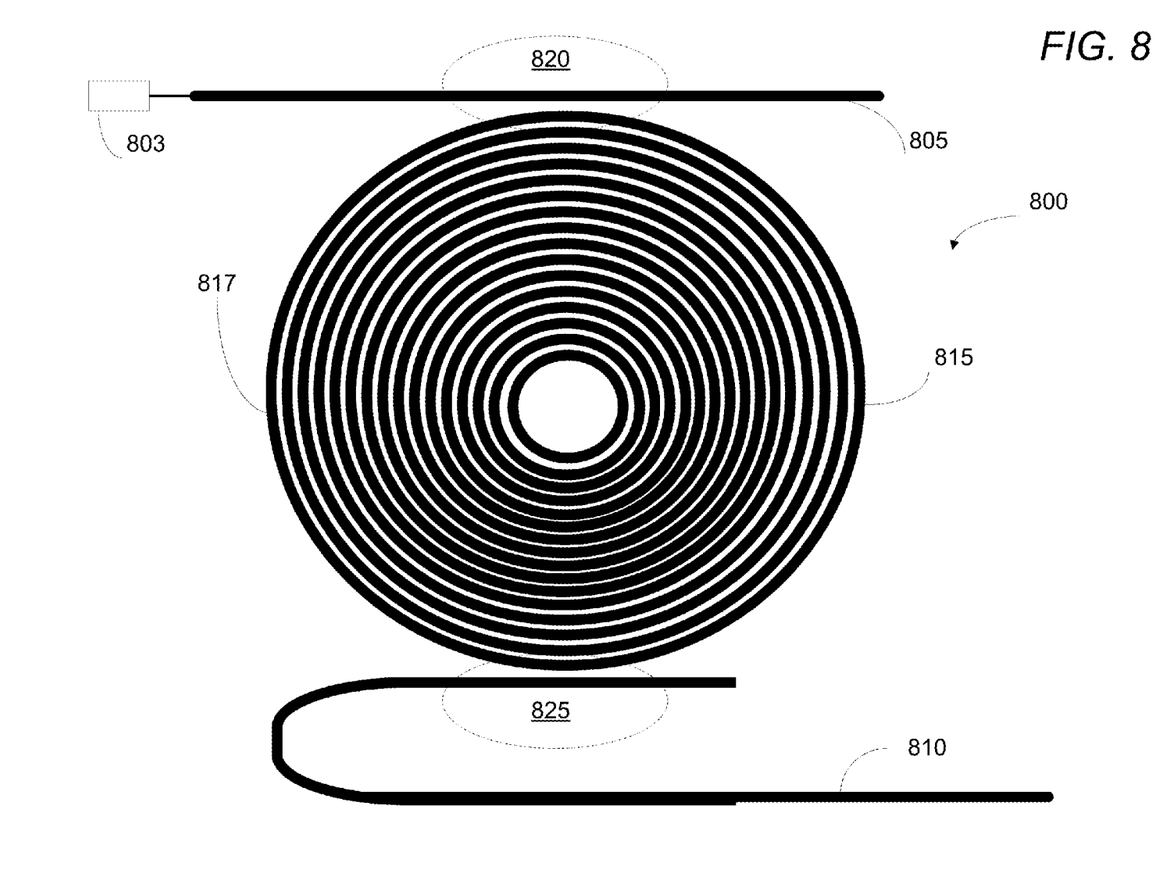
FIG. 8 is a schematic illustration of a disclosed embodiment of an apparatus where each loop has internal interfaces across their entire length.

FIG. 8 shows an illustrative embodiment where each of the loops of the nested resonator has internal interfaces with both adjacent loops that span their entire length of the loop. The apparatus 800 includes an input waveguide 805, an output waveguide 810, a nested resonator 815 and an optional source 803. The external loop 817 of the nested resonator 815 has an input interface 820 and an output interface 825. Each of the additional loops is coupled along their entire length with both its internal loop and its external loop. As can be seen in FIG. 8, the distance between the external loop 817 and the input waveguide 805 need not be the same as the distance between the external loop 817 and the output waveguide 810 (such can apply to any embodiment contemplated herein). Such a structure could be considered an optical capacitor. Structures such as those depicted in FIG. 8 would be inherently more unstable and/or chaotic then nested resonators disclosed above.

Figure 9:
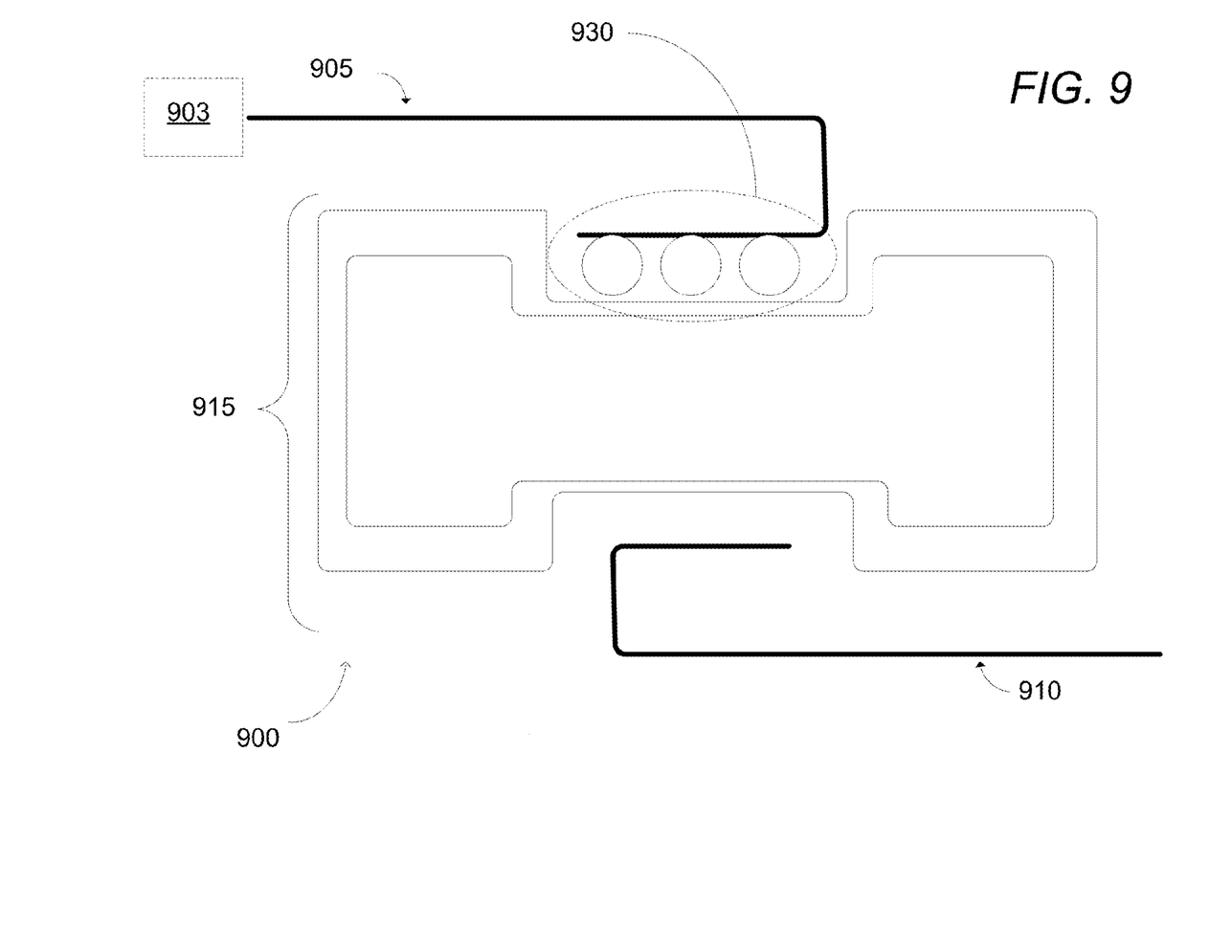
FIG. 9 is a schematic illustration of a disclosed embodiment of an apparatus that includes optional coupled un-nested resonators.

In some embodiments, additional optical components can be included or configured with the input waveguide, the output waveguide, and the nested resonators. For example, in some embodiments, an un-nested resonator, a chain of un-nested resonators (e.g., CROWs), or some combination thereof can be coupled between the input waveguide and the nested resonator. An illustrative example of such an apparatus is depicted in FIG. 9. The apparatus 900 in FIG. 9 includes an input waveguide 905, an output waveguide 910, a nested resonator 915, and a coupled resonator 930. Although the coupled resonator 930 is depicted in FIG. 9 as a chain of un-nested resonators, it should be recognized by one of skill in the art having read this specification, that the coupled resonator 930 can include single un-nested resonators, chains of un-nested resonators or any combination thereof, for example.

Disclosed apparatuses can be utilized for numerous purposes, including for example splitting an optical signal, modulating an optical signal, providing a delay in an optical signal, smoothing an optical signal, acting as a capacitor, acting as an enhanced time delay structure, acting as optical memory, or any combination thereof. Disclosed apparatuses can offer advantages of producing properties and functions that had previously required larger areas to create, for example.

EXAMPLE

Simulations were carried out to assess the effective duration over which different possible structures could store energy, e.g., to determine the time constants of the various structures.

If it is assumed that energy can be stored for T seconds in a waveguide, the light can be captured in a waveguide of length L (in meters), where $L=T*c/N$ [m], where c is the speed of light ($3\times10^8$ m/s) and N is the effective index of the guide. Propagation loss in dB along the waveguide is $A=L*D*100=T*c*D*100/N$ [dB], where D is the propagation loss in [dB/cm]. In order to express the loss in unitless factors $B=10^{\wedge}(-A/10)$. Note that B can be seen as the energy efficiency of the apparatus. Based on these assumptions, B vs. pulse input duration (t) for several types of waveguides were simulated.

The simulation showed that, a Silicon on Insulator (SoI) waveguide (for example) with 2 dB/cm energy can only be efficiently stored for <50 picoseconds (ps) pulses. For less lossy waveguides such as silicon nitride—$Si_3N_4$ (0.1 dB/cm), or glass (0.001 dB/cm), for example, the apparatus may provide energy for pulses <1 ns and <50 ns, respectively. It should be noted that the apparatuses may be less efficient than the simulation showed due to coupler loss and phase mismatches between loops.

From the above if a SoI based apparatus were used, for example, to stabilize input power, it may only be able to be used for fluctuations that are less than 50 ps.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of optical apparatus including nested resonators are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. An apparatus comprising:
   an input waveguide and an output waveguide; and
   a nested resonator comprising at least an external loop and
      a nested loop positioned entirely inside the external loop, each loop independently having a length that supports a single resonant wavelength, the external loop further comprising:
      an input interface configured to couple energy between the input waveguide and the nested resonator,
      an output interface configured to couple energy between the nested resonator structure and the output waveguide, and
      an internal interface, the external loop and the nested loop configured to couple energy there between via the internal interface.

2. The apparatus according to claim 1, wherein the nested resonator comprises at least 3 nested loops.

3. The apparatus according to claim 2, wherein the nested resonator comprises the external loop, the first nested loop, a second nested loop, a third nested loop, and a fourth nested loop.

4. The apparatus according to claim 3, wherein the second nested loop comprises a second internal interface configured to couple energy between the first nested loop and the second nested loop.

5. The apparatus according to claim 1, wherein the nested resonator comprises indium phosphide.

6. The apparatus according to claim 5, wherein the nested resonator comprises at least 10 loops.

7. The apparatus according to claim 1, wherein the nested resonator has a dimension from about 10 μm to about 5 mm.

8. The apparatus according to claim 1, wherein the nested loop further comprises a second internal interface configured to couple energy between the nested loop and the external loop.

9. The apparatus according to claim 1, wherein the nested resonator comprises silicon, silicon nitride ($Si_3N_4$), glass, polymer, indium phosphide, gallium arsenide, or combinations thereof.

10. The apparatus according to claim 1, wherein the nested resonator comprises silicon nitride ($Si_3N_4$).

11. The apparatus according to claim 1 further comprising a group refractive index tuning element or at least two individual refractive index tuning elements.

12. The apparatus according to claim 1 further comprising an un-nested resonator, a chain of un-nested resonators (e.g., CROWs), or some combination thereof coupled between the input waveguide and the nested resonator.

13. The apparatus according to claim 1 further comprising a continuous wave source, the continuous wave source supplying at least a first and a second wavelength of energy to the input waveguide, and wherein the loops of the nested resonator support the first wavelength.

14. The apparatus according to claim 1, wherein the nested resonator has a dimension from about 10 μm to about 500 μm.

15. An apparatus comprising:
an input waveguide and an output waveguide; and
a nested resonator comprising at least an external loop and a nested loop positioned entirely inside the external loop, each loop independently having a length that supports a single resonant wavelength, each loop comprising silicon nitride ($Si_3N_4$), and the external loop further comprising:
an input interface configured to couple energy between the input waveguide and the nested resonator,
an output interface configured to couple energy between the nested resonator structure and the output waveguide, and
an internal interface, the external loop and the nested loop configured to couple energy there between via the internal interface.

16. An apparatus comprising:
an input waveguide;
at least two output waveguides including a first output waveguide and a second output waveguide;
a first nested resonator configured adjacent the first output waveguide; and
a second nested resonator configured adjacent the second output waveguide;
each of the first and the second nested resonators comprising at least an external loop and a nested loop positioned entirely inside the external loop, each loop independently having a length that supports a single resonant wavelength, the external loop further comprising:
an input interface configured to couple energy between the input waveguide and the nested resonator,
an output interface configured to couple energy between the nested resonator structure and the respective adjacent output waveguide, and
an internal interface, the external loop and the nested loop configured to couple energy there between via the internal interface.

17. The apparatus according to claim 16, wherein the first and the second nested resonators each independently comprises at least three (3) nested loops.

18. The apparatus according to claim 16, wherein the first and the second nested resonators each independently comprise silicon, silicon nitride ($Si_3N_4$), glass, polymer, indium phosphide, gallium arsenide, or combinations thereof.

19. The apparatus according to claim 16 further comprising a continuous wave source, the continuous wave source supplying at least a first and a second wavelength of energy to the input waveguide.

20. The apparatus according to claim 19, wherein the loops of the first nested resonator independently have lengths that support the first wavelength and the loops of the second nested resonator independently have lengths that support the second wavelength.

* * * * *